(12) United States Patent
Schloesser et al.

(10) Patent No.: US 9,642,309 B2
(45) Date of Patent: May 9, 2017

(54) YIELD MONITORING SYSTEM (71) Applicant: OXBO INTERNATIONAL CORPORATION, Byron, NY (US)

(72) Inventors: Christopher M Schloesser, Hudson, WI (US); Robert G Bennett, River Falls, WI (US)

(73) Assignee: Oxbo International Corporation, Byron, NY (US)

( * ) Notice: Subject to any disclaimer, the term of this patent is extended or adjusted under 35 U.S.C. 154(b) by 452 days.

(21) Appl. No.: 14/213,742

(22) Filed: Mar. 14, 2014

(65) Prior Publication Data

US 2014/0260706 A1 Sep. 18, 2014

Related U.S. Application Data (60) Provisional application No. 61/793,706, filed on Mar. 15, 2013.

(51) Int. Cl.
*A01D 75/00* (2006.01)
*A01D 41/127* (2006.01)
*A01D 43/08* (2006.01)
*E03F 7/04* (2006.01)
*F16K 15/03* (2006.01)

(52) U.S. Cl.
CPC ............ *A01D 75/00* (2013.01); *A01D 41/127* (2013.01); *A01D 41/1271* (2013.01); *A01D 43/085* (2013.01); *E03F 7/04* (2013.01); *F16K 15/03* (2013.01); *Y10T 137/7903* (2015.04)

(58) Field of Classification Search
None
See application file for complete search history.

(56) References Cited

U.S. PATENT DOCUMENTS

| 4,305,244 A | 12/1981 | Seymour et al. |
| 4,510,948 A | 4/1985 | Dekeyzer |
| 4,540,003 A | 9/1985 | Osselaere |
| 4,890,447 A | 1/1990 | Grandinetti |
| 5,082,188 A | 1/1992 | Urich |
| 5,199,248 A | 4/1993 | Hale et al. |
| 5,359,900 A * | 11/1994 | Hafner ................. G01F 1/8454 73/861.354 |

(Continued)

OTHER PUBLICATIONS

On the Road to Precision Farming—It All Begins With Yield Monitoring, Yield Monitoring—Grains, Michigan State University, Jul. 1998, http://www.rogerbrook.com/publications/prec_ag/jul1998.html, printed Jan. 15, 2016, 3 pages.

(Continued)

*Primary Examiner* — Robert R Raevis
(74) *Attorney, Agent, or Firm* — Merchant & Gould P.C.

(57) ABSTRACT

A yield monitoring system for a grain harvester includes a large strike plate mounted on parallel four bar linkages. The strike plate intercepts a larger portion of the clean grain flow and is supported near the four corners to provide even translation and force transmission even if not struck in the center of the plate. The four bar linkages provide translational movement relative to a center load cell. An engagement bracket at the center of the strike plate includes a surface that is aligned perpendicularly to the sensing element of the load cell.

21 Claims, 12 Drawing Sheets

(56) References Cited

U.S. PATENT DOCUMENTS 8,196,379 B2 6/2012 Straeter
2007/0044336 A1* 3/2007 Ilkubo .................. A61B 8/4218
33/503

OTHER PUBLICATIONS

Lems et al., SSMG-31, Yield Monitors-Basic Steps to Ensure System Accuracy and Performance, Site-Specific Management Guidelines, Potash & Phosphate Institute, South Dakota State University, Ref 20151/Item 10-1031, 4 pages.
Shearer et al., Elements of Precision Agriculture: Basics of Yiel Monitor Installation and Operation, University of Kentucky—College of Agriculture, http://www.ca.uky.edu, Issued Jun. 1999, 10 pages.

* cited by examiner

YIELD MONITORING SYSTEM

BACKGROUND OF THE INVENTION

Field of the Invention

The present invention relates to a yield monitoring system and in particular to a load cell impact plate intercepting a portion of clean grain flow within a harvester.

Description of the Prior Art

Yield monitoring systems are commonly used for grain combines and other harvesters to determine the yield of the crop being harvested. Such systems typically use a small impact plate inserted downstream in the harvester and the clean grain flow path. The impact plate typically has an area of approximately four inches by six inches and deflects a portion of the flow. The impact of the flow being deflected places a load on the impact plate, which is transmitted to a load cell. The force measured by the load cell is calibrated so that the flow and therefore the yield can be calculated.

Although such yield measurement systems may be satisfactory for many applications, there are problems. The small impact plate may not provide an accurate measurement of the flow. For certain types of crops in which the fruit or vegetables are relatively large, such as for example ear corn, potatoes, citrus and similar sized crops, such systems are more prone to error and may not provide satisfactory results. The large objects being transported, such as ears of corn, compared to small articles such as granular grains, may impact with a greater force. However, depending on where the particular ears strike the impact plate, the force may not be accurately conveyed to and sensed by the load cell. Moreover, the flow path in an ear corn or other harvester for relatively large crops is larger than for other types of grain harvesters and a relatively small impact plate may not intercept a sufficient percentage of the crop flow and may not therefore accurately reflect the actual flow. Moreover, the direct mounting of the load cell to the impact plate results in inaccuracies should the ears of corn strike an edge of the plate or otherwise impact the plate at varied angles, which may not press the plate squarely against the load cell.

It can therefore be seen then that a new and improved yield monitoring system is needed that accurately measures the harvest yield of grains including larger crops such as ear corn to eliminate false readings obtained in prior art systems. Such a system should intercept a sufficiently large percentage of the clean grain flow to provide accurate flow measurement. Moreover, the impact plate should be mounted in such a manner that the impact force will always be accurately transmitted to the load cell from strikes on all areas of the strike plate. Such a mounting system should also be reliable and should have a long operating life. The present invention addresses these as well as other problems associated with yield monitoring systems.

SUMMARY OF THE INVENTION

The present invention is directed to a yield monitoring system for a harvester. Grain harvesters and in particular corn harvesters for ear corn utilize combined harvesting and threshing to achieve a clean grain and in the case of ear corn harvesters, ears of corn. Such combines include a monitoring system to determine the yield from the harvest. Such information may be utilized in many ways for improved crop management practices. The yield monitoring system of the present invention is placed in a position within the flow of clean grain to deflect ears of corn and provide a measurement of the force from the flow and therefore determine a yield. An enlarged strike plate is utilized that deflects a large portion of the flow as compared to prior art systems. The larger strike plate includes a parallelogram type support assembly that provides even distribution of forces no matter where engaged by the strike plate and passes the force along to a load cell in an even manner to provide more accurate measurement to determine yield.

The strike plate mounts on spaced apart brackets near left and right sides of the support plate. The support assembly mounts to a center vertical rectangular tube mounted to a cross member of the chassis of the harvester. Upper and lower torsion tubes extend from the square mounting tube and are aligned with rotational axes for upper ends of parallel arms for the linkage of the support assembly. The support assembly includes upper and lower parallel arms connecting to the torsion tubes with a left pair of upper and lower arms and a right pair of upper and lower arms. The arms rotate at an upper end to the mounting tube and at a lower end are pivoted to collars of the mounting brackets of the strike plate that receive lower torsion tubes. In this manner, the strike plate is mounted with translational motion supported by the linkage of the support assembly. In the use position, the strike plate is mounted with the arms extending generally downward and slightly forward from the mounting tube.

The load cell is mounted and positioned below the center mounting tube. The load cell includes a sensing element extending outward from the load cell and striking an engagement bracket at a center portion of the strike plate. The engagement bracket has an engagement surface extending at an orthogonal angle relative to the strike plate that is configured to be substantially perpendicular to the sensing element of the load cell. In this manner, the translational motion of the linkage results in a force being aligned and directly applied from the engagement bracket on the strike plate against the sensing tab on the load cell. The load cell is calibrated to zero out any static force from the weight of the strike plate and support assembly.

The yield monitoring system of the present invention provides for stable mounting over with spaced apart support points providing a larger base for the strike plate that ensures aligned and accurate engagement with a load cell sensor even if impact forces are due to striking an edges of a strike plate or are unevenly applied, as may occur with the small prior art direct mounting systems. The translational movement provides more accurate measurement and ensures a constant engagement angle with the load cell sensor. Moreover, the larger strike plate intercepts a larger percentage of the clean grain flow and provides more accurate measurement. The support assembly also provides for direct aligned engagement between the support bracket of the strike plate and the sensing tab of the load cell to overcome problems that may occur due to misalignment from prior art systems.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

DETAILED DESCRIPTION OF THE PREFERRED EMBODIMENT

Figure 1:
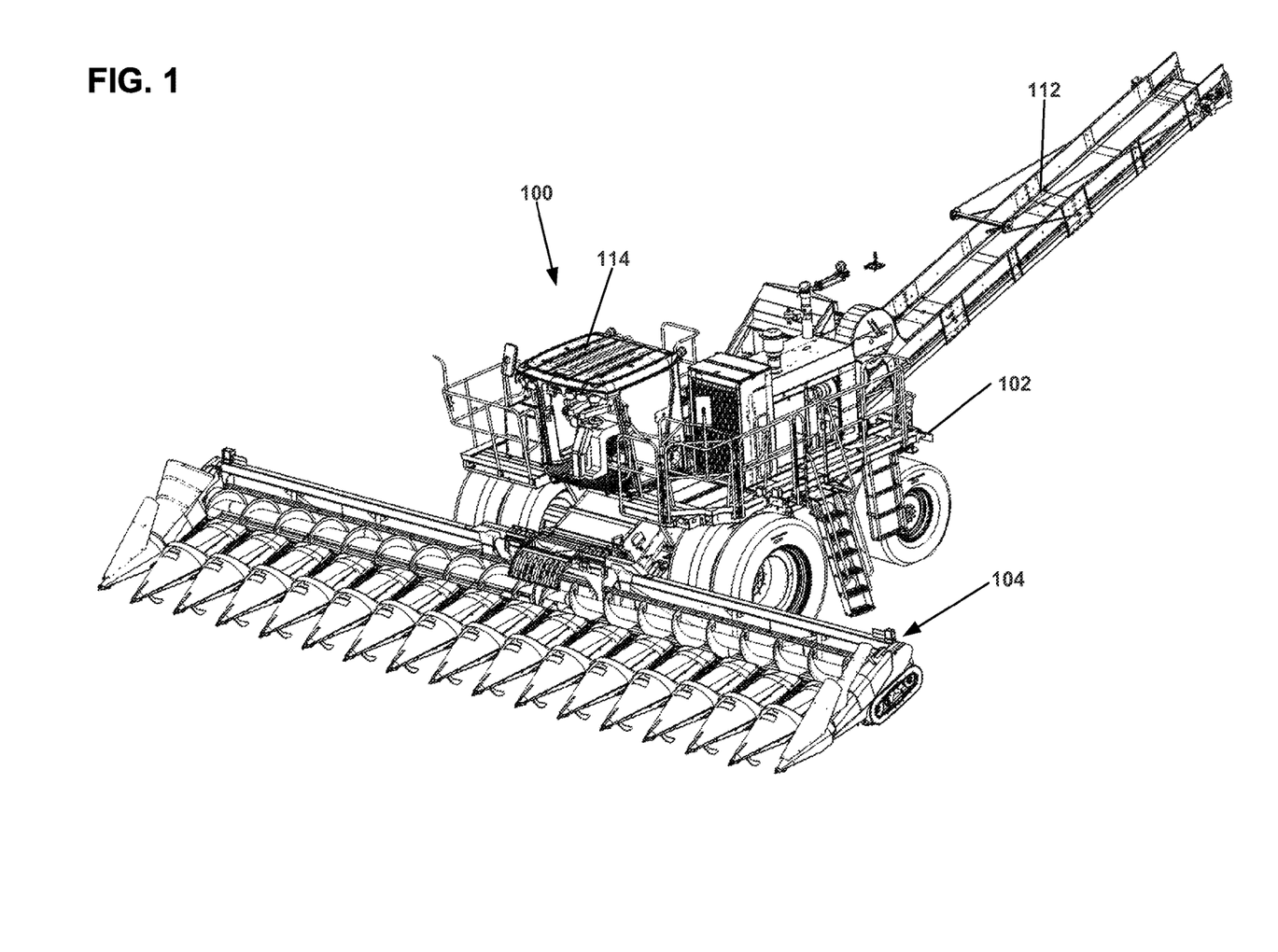
FIG. 1 is a perspective view of harvester according to the principles of the present invention.

Referring to FIG. 1, there is shown a combine harvester, generally designated (100). The harvester (100) includes a chassis (102) supporting a head (104), a rear conveyor (112) and a cab (114). The head (104) harvests corn from the field and directs clean ears of corn rearward through processing and removal of the stalks and other unwanted debris, commonly referred to as matter other than grain.

Figure 2:
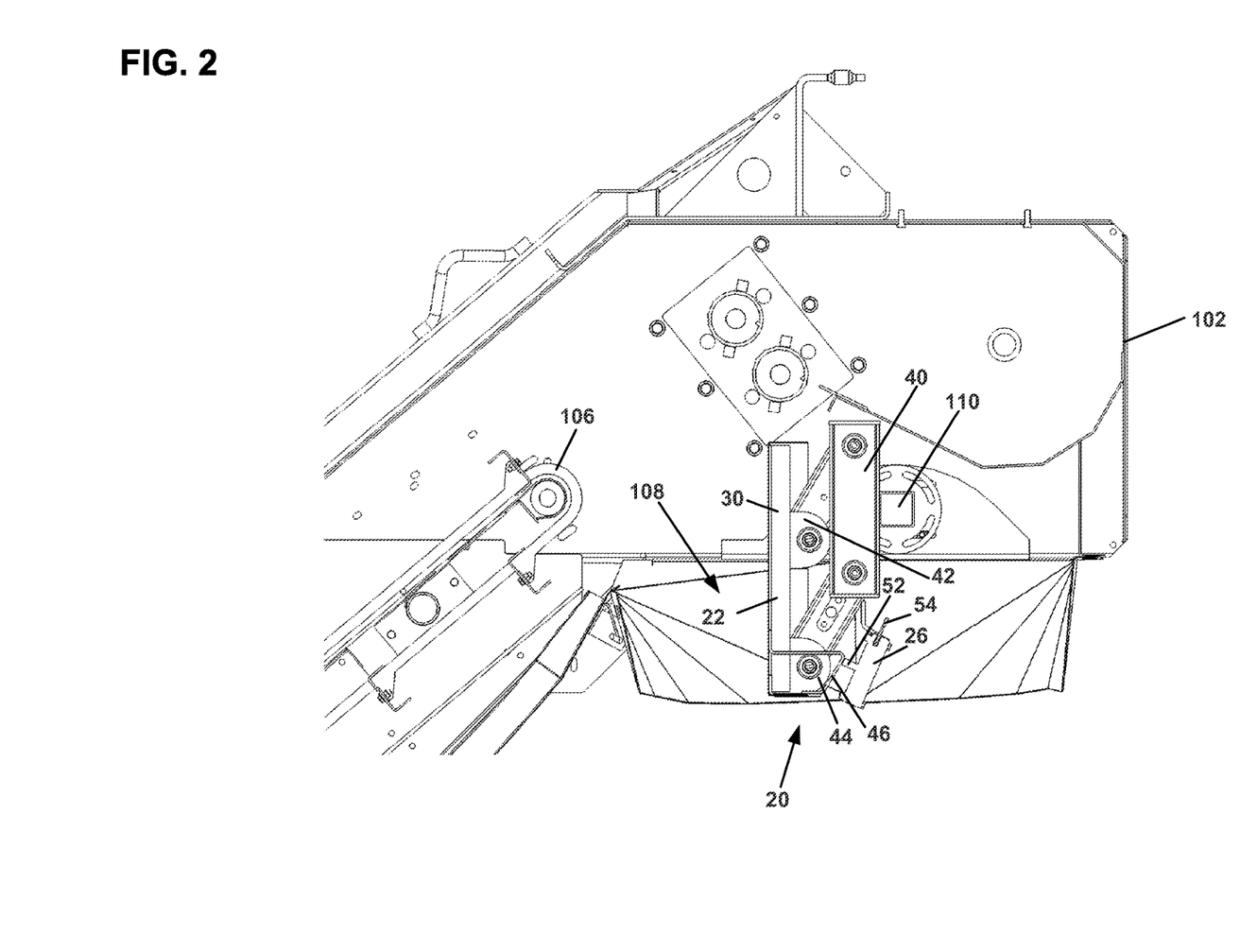
FIG. 2 is a side sectional view of a portion of a crop conveying system and a first embodiment of a yield monitoring system for the harvester shown in FIG. 1.
Figure 3:
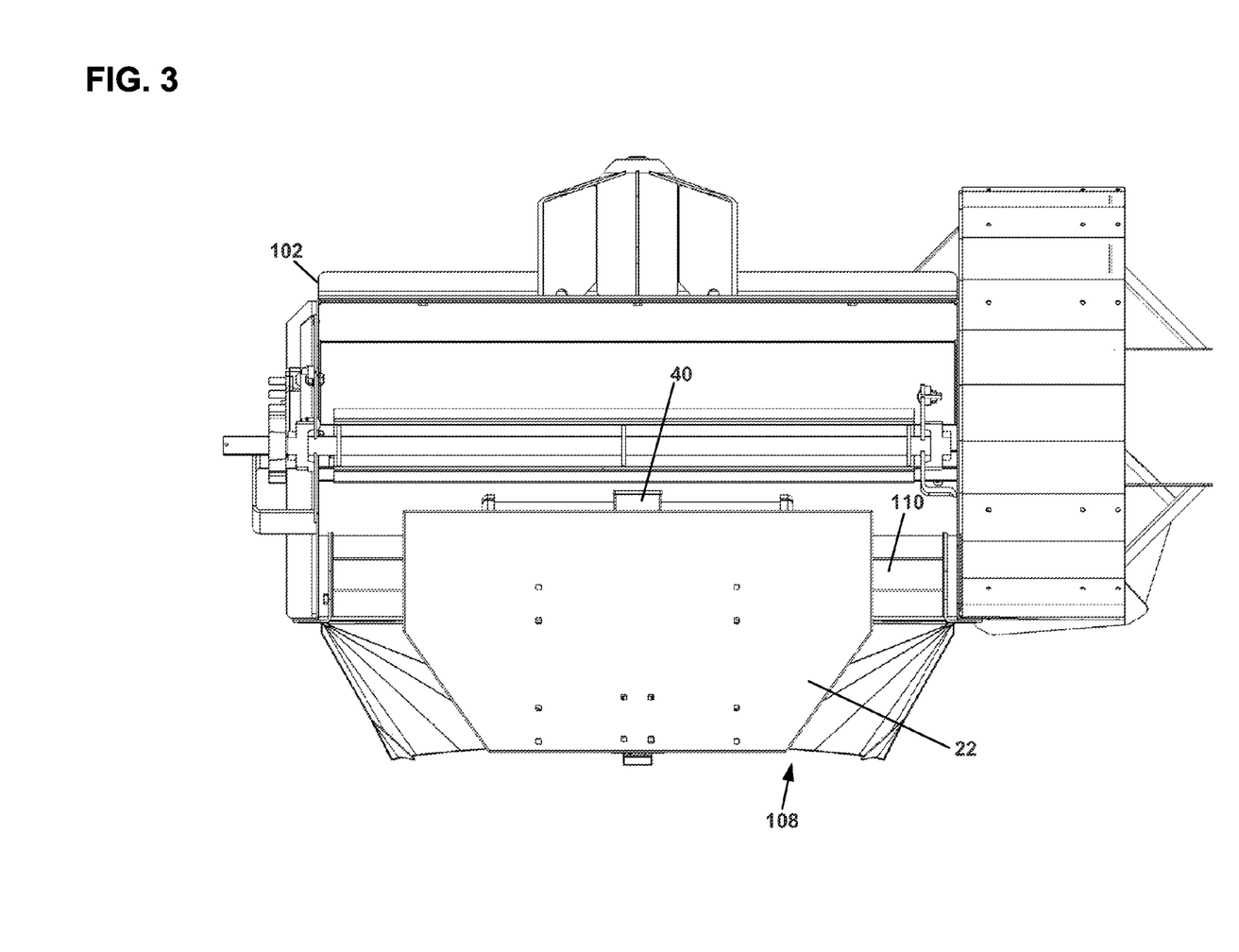
FIG. 3 is a front detail view of the yield monitoring system for the crop conveying system shown in FIG. 2.

Referring now to FIGS. 2 and 3, the yield is measured along a clean grain flow path within the chassis (102). A yield monitoring system (20) may be positioned to measure clean ears of corn as they are delivered from a conveyor (106) to a clean grain chute (108). The yield monitoring system (20) includes a strike plate (22) a support assembly (24) and a load cell (26). The yield monitoring system (20) generally mounts to a chassis cross bar (110). As shown in FIG. 3, the strike plate extends across a substantial portion of the clean grain chute (108). In the embodiment shown, the strike plate (22) may intercept 75% or more of the flow path as compared to prior art devices that may intercept only 10-15% of the flow path. As shown in FIG. 2, the strike plate (22) is configured to deflect the flow back and downward and the impact on the strike plate (22) can be measured as the forces transfer through the support assembly to the load cell (26).

Figure 4:
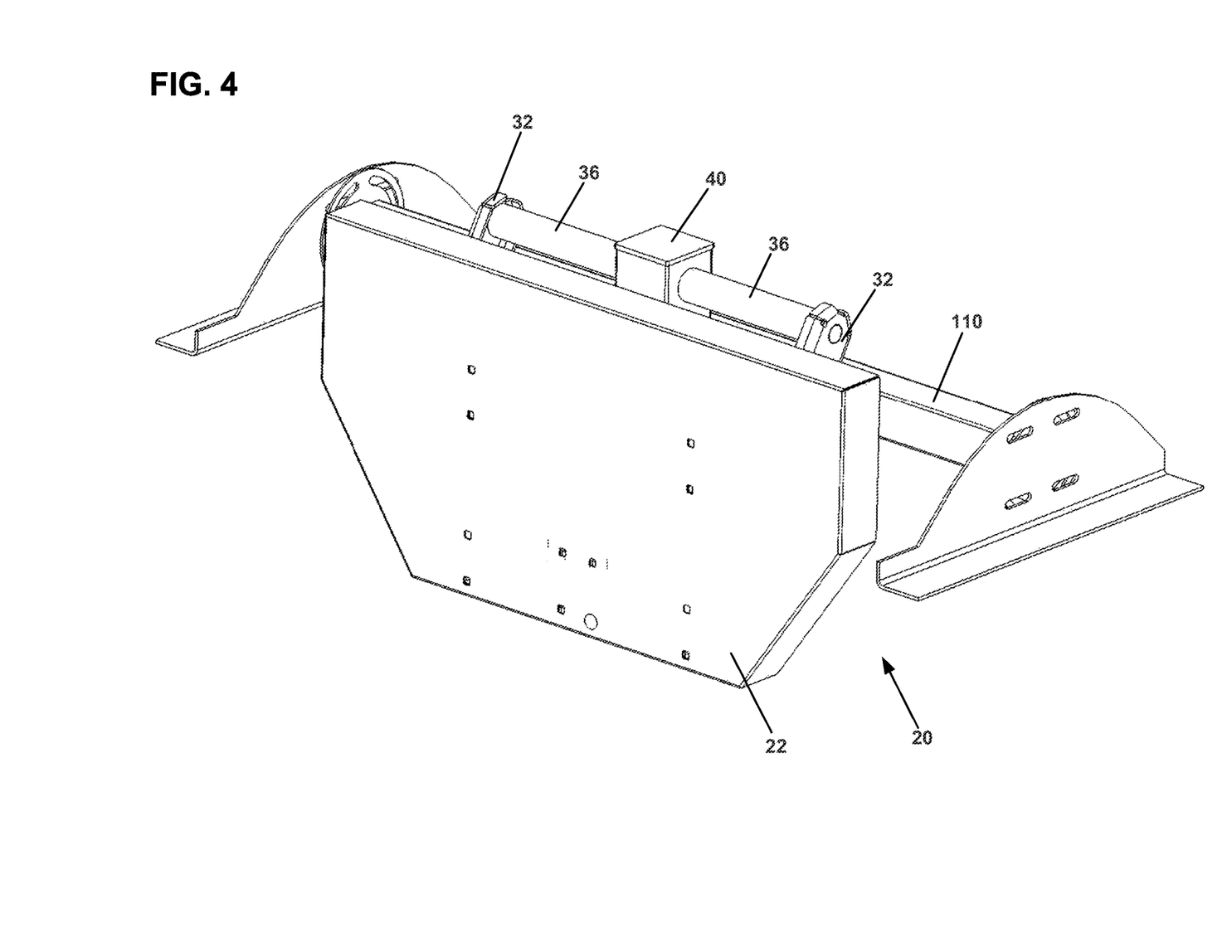
FIG. 4 is a front perspective view of a strike plate and support assembly for the yield monitoring system shown in FIG. 3.
Figure 5:
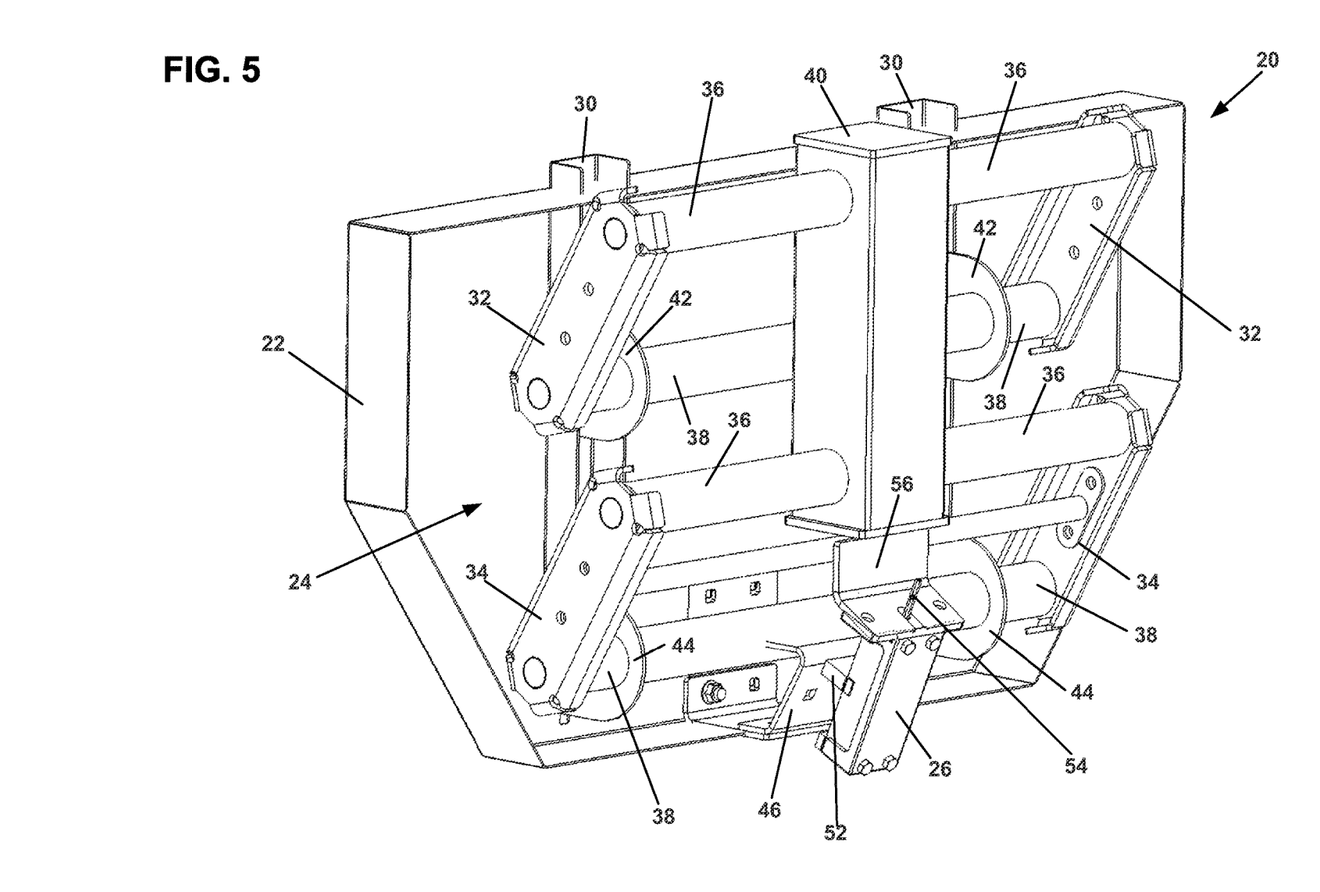
FIG. 5 is a rear perspective view of the strike plate and support assembly shown in FIG. 4.
Figure 6:
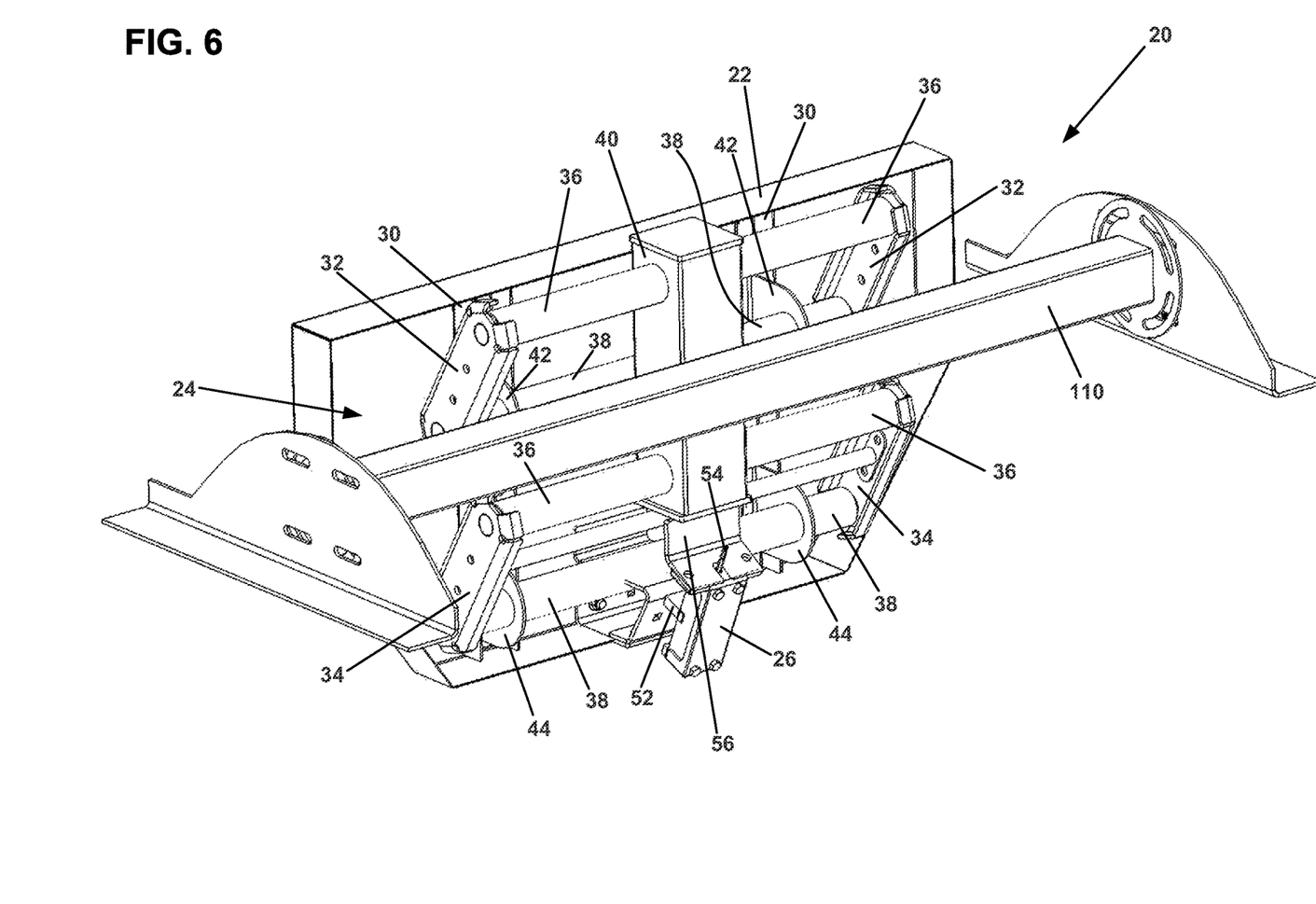
FIG. 6 is a rear perspective view of the strike plate and support assembly shown in FIG. 4 and a mounting bar of the chassis.
Figure 7:
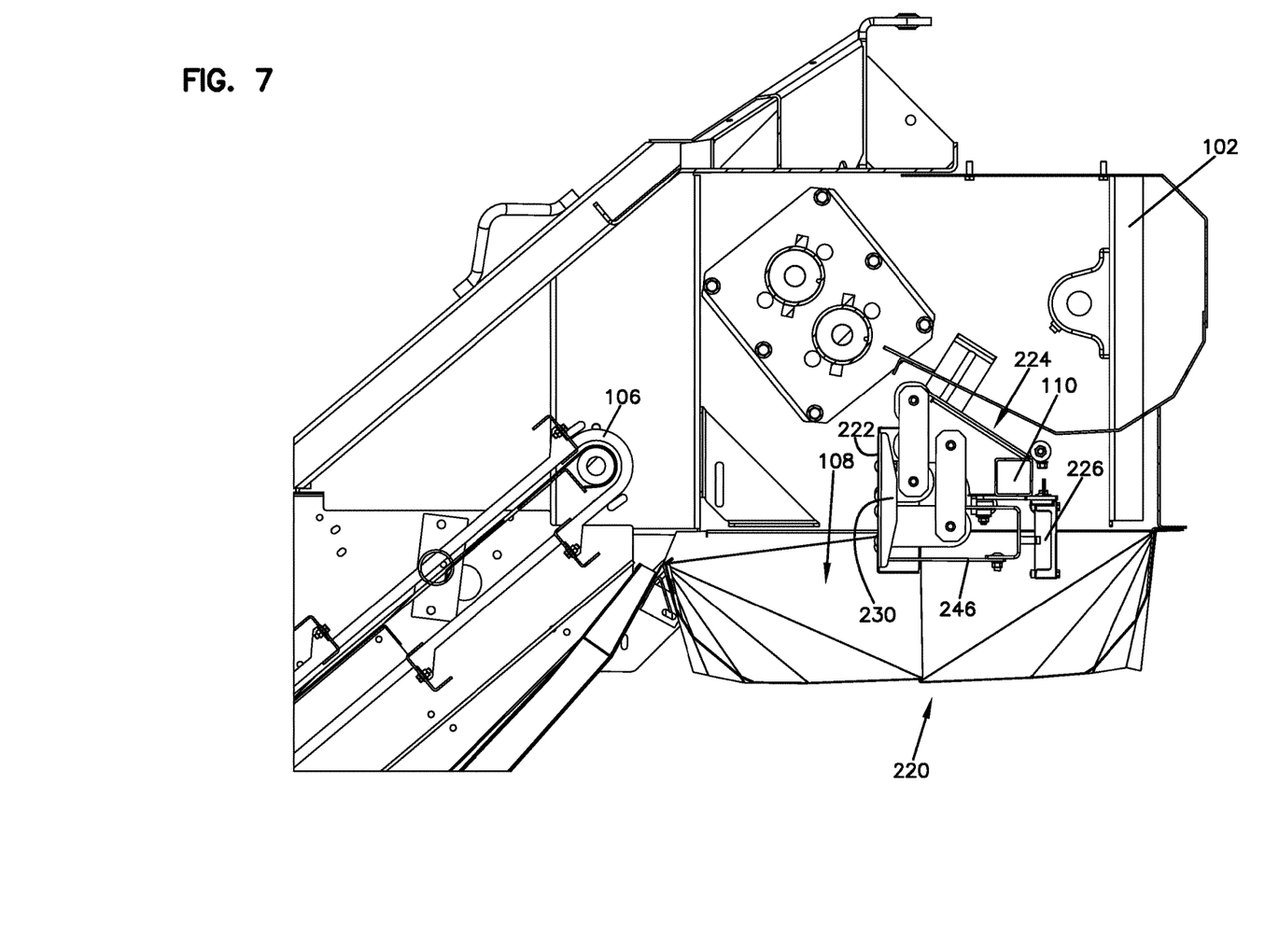
FIG. 7 is a side sectional view of a portion of a crop conveying system and a second embodiment of a yield monitoring system for the harvester shown in FIG. 1.
Figure 8:
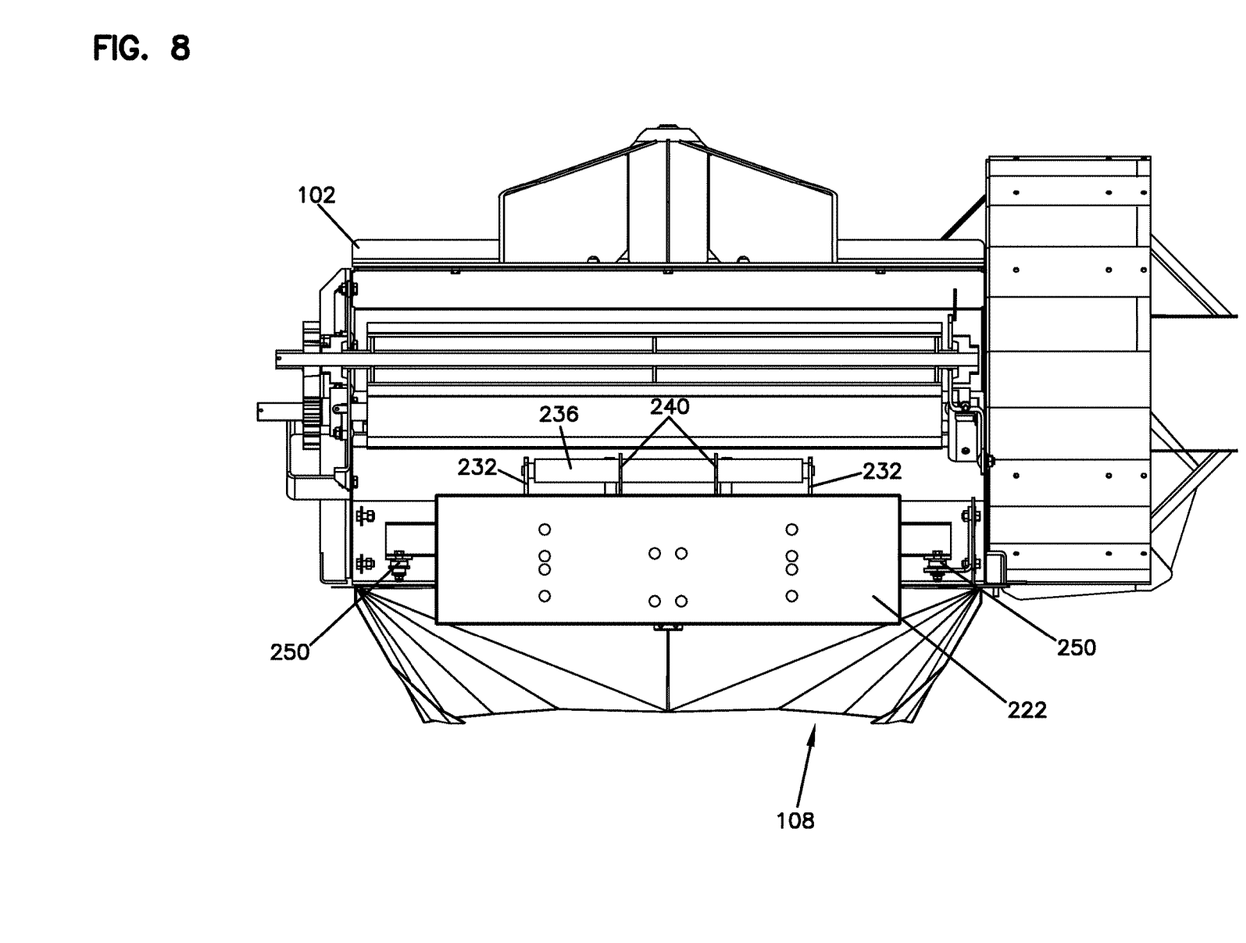
FIG. 8 is a front detail view of the yield monitoring system for the crop conveying system shown in FIG. 8.
Figure 9:
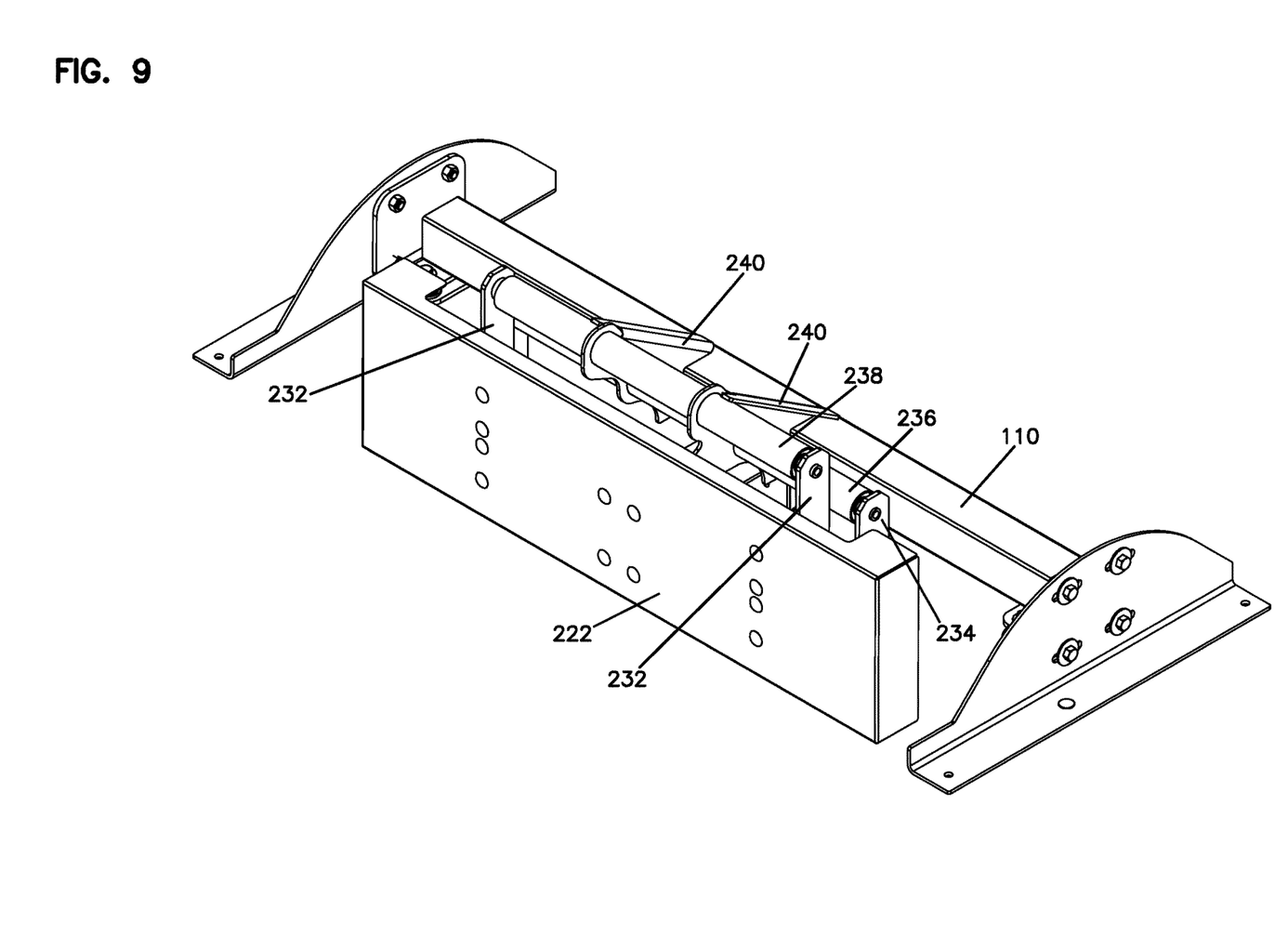
FIG. 9 is a front perspective view of a strike plate and support assembly for the yield monitoring system shown in FIG. 7.
Figure 10:
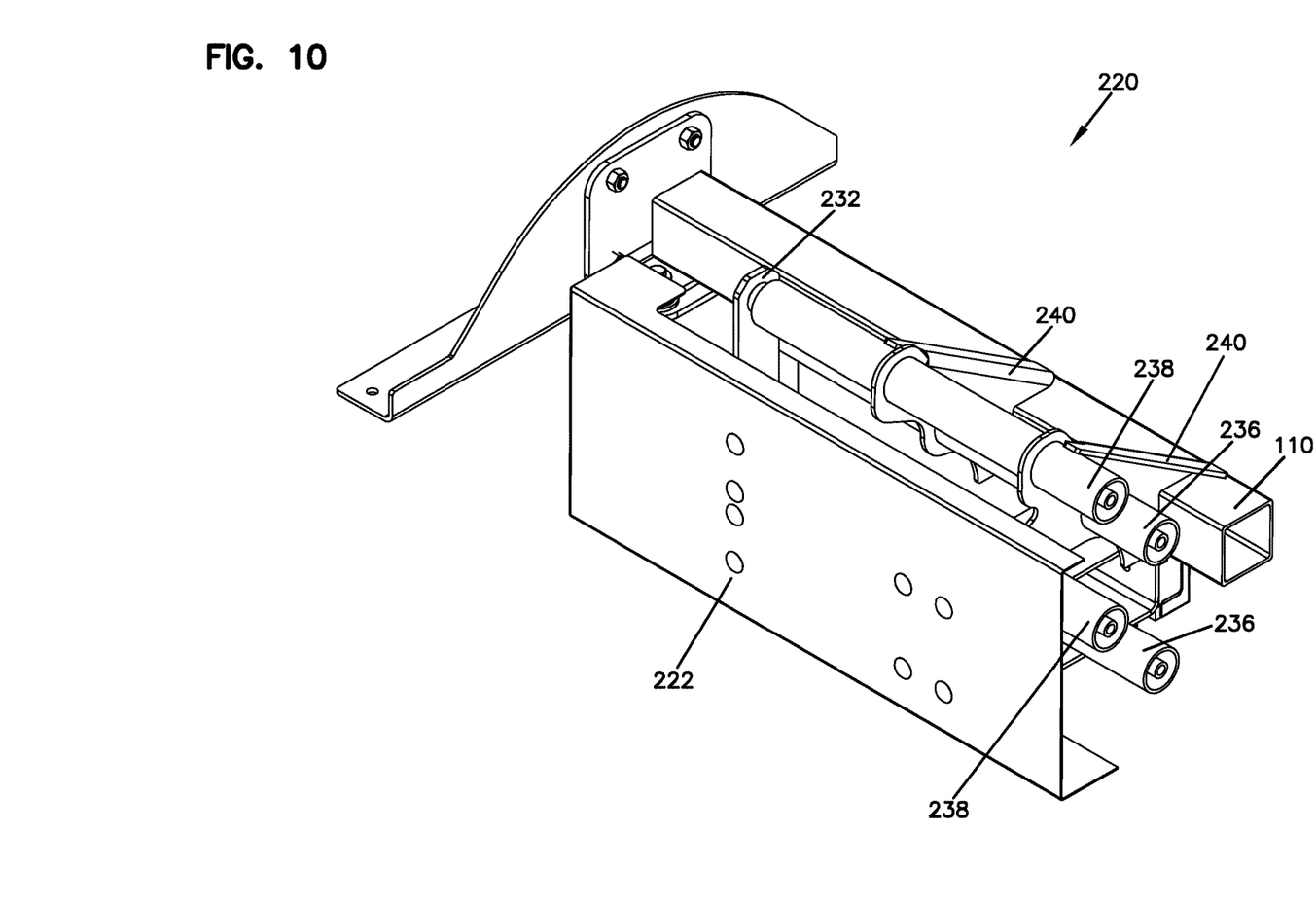
FIG. 10 is a front perspective view of the strike plate and support assembly shown in FIG. 7 with portions broken away.

Referring now to FIGS. 4-6, a first embodiment of the yield monitoring system (20) includes a four bar linkage type support assembly (24) providing translational movement of the strike plate (22) to transfer the force on the strike plate (22) to the load cell (26). The strike plate (22) includes spaced apart mounting brackets (30) with upper collars (42) and lower collars (44) receiving torsion tubes (38). Upper arms (32) and lower arms (34) are spaced apart at opposite ends of torsion tubes (36) and (38) and laterally outward from the mounting brackets (30). The torsion tubes (36) and (38) provide pivot axes for the linkage type support assembly (24) and include internal bearings at the arms (32) and (34). With support locations spaced vertically and laterally apart, the strike plate (22) is more broadly and evenly supported than single point supports of the prior art. The torsion tubes connect to a center generally vertically extending square mounting tube (40). The strike plate (22) therefore swings generally outward and upward from the position shown in FIGS. 4-6 but rests in the use position shown due to gravity. One or more of the torsion tubes (36) and (38) may include a counteracting torque to prevent lifting of the strike plate (22) to maintain a deflecting position so that the plate (22) does not block the flow path of the grain.

The center mounting tube (40) connects to a cross member (110) above the chute (108), as shown in FIGS. 4 and 6.

The load cell (26) mounts generally at the center of the strike plate (22) below the mounting tube (40); portions of the mounting hardware have been removed for clarity. The load cell (26) includes a mounting bracket (56) and a sensing tab (52). As shown in FIGS. 5 and 6, the strike plate (22) includes a load cell engagement bracket (46). The bracket (46) includes an angled portion having a surface generally perpendicular to the end of the sensor (52). With this configuration, the force passed through the support assembly is transferred directly aligned with the sensing tab (52) of the load cell (26). A lead (54) extends from the top of the load cell (26) and connects to a processor to receive the information from the load cell (26).

Referring now to FIGS. 7-13, a second embodiment of the yield monitoring system (220) also includes a four bar linkage type support assembly (224) providing translational movement of a strike plate (222) to transfer the force on the strike plate (222) to a load cell (226). The strike plate (222) includes spaced apart mounting brackets (230) with upper collar type portions (242) and lower collar type portions (244) receiving torsion tubes (238). Upper arms (232) and lower arms (234) are spaced apart at opposite ends of torsion tubes (236) and (238) and laterally outward from the mounting brackets (230). The torsion tubes (236) and (238) provide pivot axes for the linkage type support assembly (224) and include internal bearings at the arms (232) and (234). With support locations spaced vertically and laterally apart, the strike plate (222) is more broadly and evenly supported than single point supports of the prior art. The upper of the torsion tubes (236 and 238) connect to spaced-apart center braces (240). The strike plate (222) therefore swings generally outward and upward from the position shown in FIGS. 9-13, but rests in the use position shown with a vertically extending face due to gravity and the mounting arrangement. One or more of the torsion tubes (236) and (238) may include a counteracting torque to prevent lifting of the strike plate (222) to maintain a deflecting position so that the plate (222) does not block the flow path of the grain.

Figure 11:
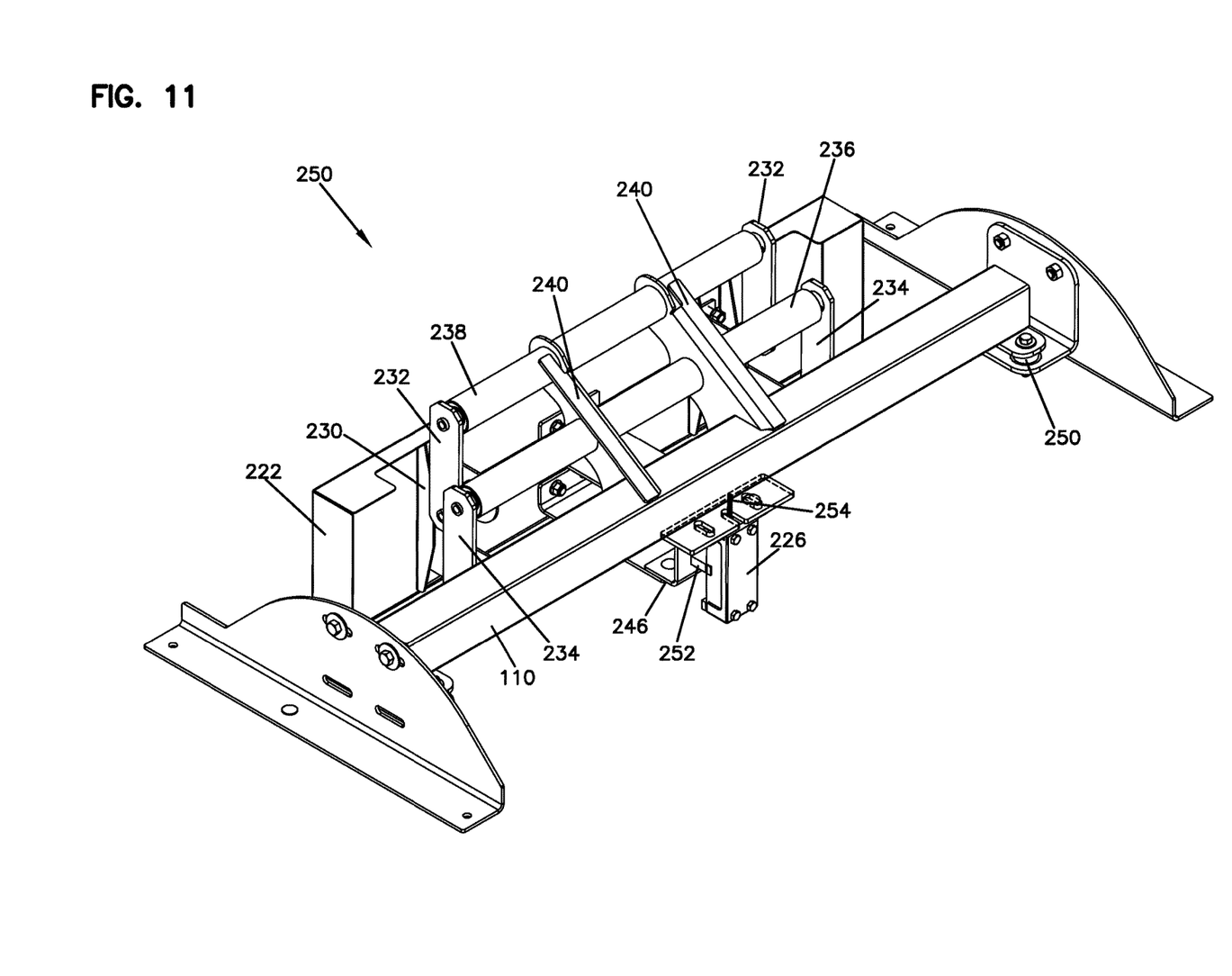
FIG. 11 is a rear perspective view of the strike plate and support assembly shown in FIG. 9 and a mounting bar of the chassis.
Figure 12:
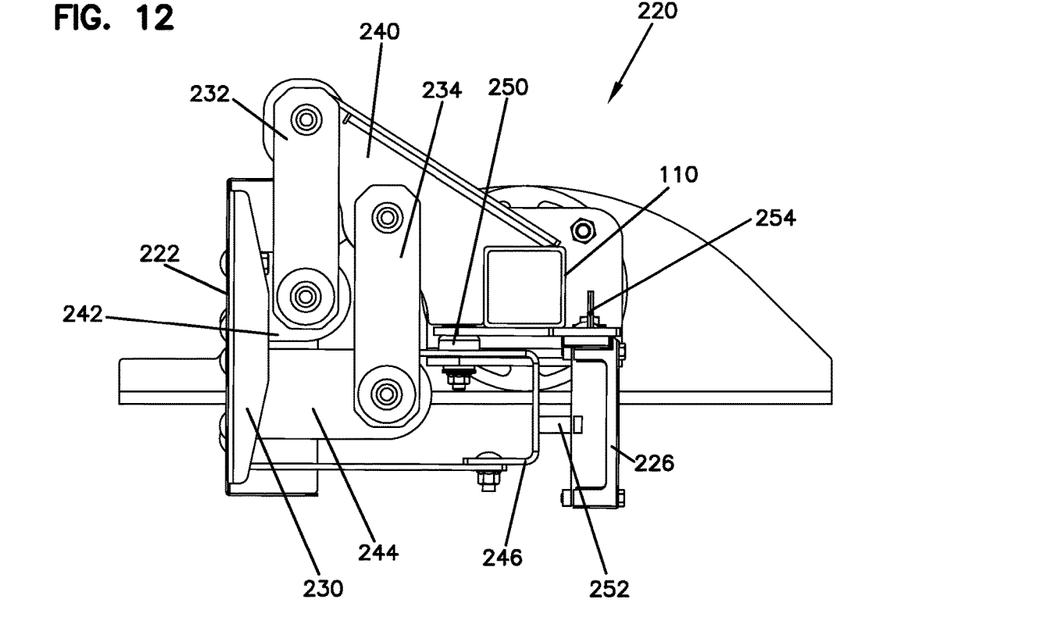
FIG. 12 is a side elevational view of the strike plate and support assembly shown in FIG. 9.
Figure 13:
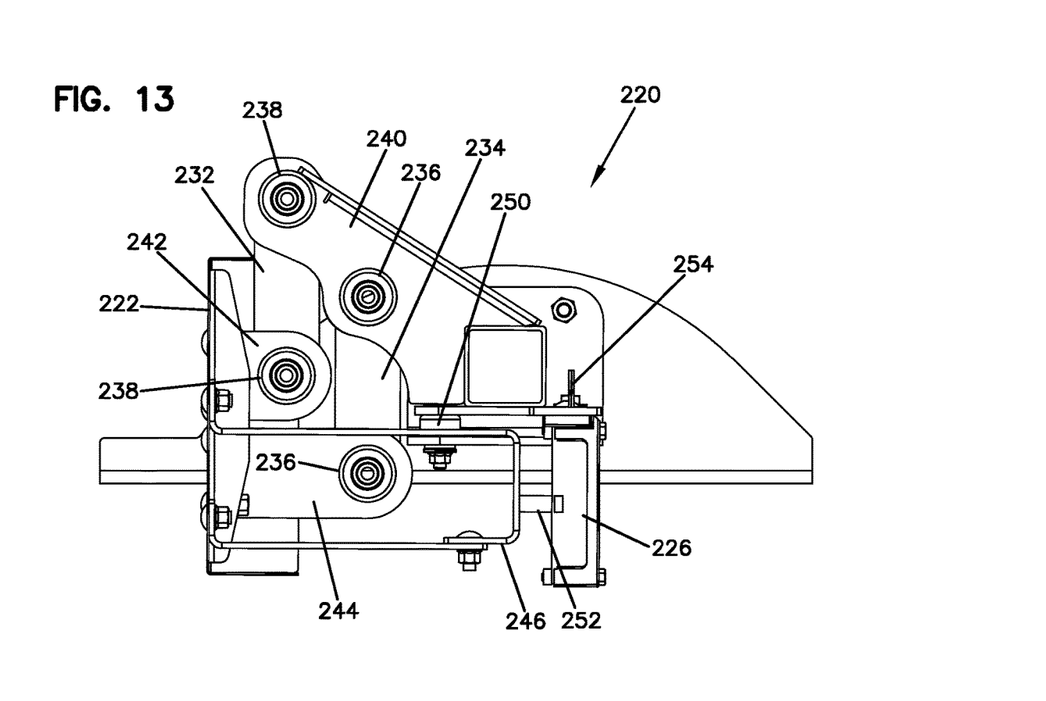
FIG. 13 is a side sectional view of the strike plate and support assembly shown in FIG. 9.

The load cell (226) mounts generally at the center of the strike plate (222); portions of the mounting hardware have been removed for clarity. The load cell (226) includes a mounting bracket (256) and a sensing tab (252). As shown in FIGS. 11-13, the strike plate (222) includes a load cell engagement bracket (246). The bracket (246) includes has a vertical surface generally perpendicular to the end of the sensor (252). With this configuration, the force passed through the support assembly is transferred directly aligned with the sensing tab (252) of the load cell (226). A lead (254)

extends from the top of the load cell (226) and connects to a processor to receive the information from the load cell (226).

As shown in FIGS. 12 and 13, the upper collars (242) extend a shorter distance than the lower collars (244) so that the mounting axes of the arms (232, 234) are spaced apart vertically and horizontally the same distance as the upper mounting axes of the arms (232,234). The support assembly (224) is configured so that the arms (232,234) hang vertically in the parallelogram of the support structure (224) and the face of the strike plate (222) is vertical. With such an arrangement, the load cell engagement bracket (246) moves horizontally against the sensing tab (252). With this arrangement there is no load against the load cell (226) in a static no-flow condition. Force due to the weight of a support structure and/or strike plate does not need to be calibrated or filtered out of measurements. Therefore there is no extra mass that might "dilute" readings and the actual force against the sensing tab (252) is due only to the force against the strike plate (222).

Referring to FIGS. 11-13, the yield monitoring system (220) mounts on isolators (250). The isolators dampen vibration so that more accurate readings may be obtained and wear to the system (220) is reduced.

The support assembly (24, 224) is arranged with substantially parallel left and right linkages providing broad support and translational motion. The strike plate (22, 222) is supported at spaced apart left and right locations and at spaced apart upper and lower points to ensure that force is translated in an even manner to the load cell (26, 226). The load cell (26, 226) is positioned substantially at the center of the strike plate (22, 222) to receive force of the strike plate evenly through the support assembly (24, 224). The support assembly (24, 224) maintains the strike plate with even translational movement so that the strike plate (22, 222) cannot be moved at an uneven angle should the left or right side of the strike plate (22, 222) experience a greater impact force. Therefore, the support assembly (24, 224) maintains the strike plate (222) in a substantially same orientation so that it does not vary between the top and bottom so the angle relative to the load cell (26, 226) is maintained. In addition to eliminating inaccuracies from uneven force distribution associated with smaller load cell strike plates, the present invention also is able to sample a larger portion of the flow leading to improved accuracy and yield measurement. The robust support assembly (24, 224) also is better able to absorb the forces that may be encountered from the increased mass from larger crops as compared to other types of measurement systems often used for small grains.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A yield measurement system, comprising:
   a strike plate;
   a support assembly comprising a connected pair of parallel four bar linkages, the strike plate defining a first link of each of the linkages, each of the linkages including a pair of parallel arms defining second and third links pivotally connected to a mounting surface defining a fourth link;
   a load cell including a sensing element engaging the support assembly.

2. A yield monitoring system according to claim 1, wherein the support assembly further comprises torsion tubes aligned along pivot axes of the linkage.

3. A yield monitoring system according to claim 1, wherein the strike plate is configured to deflect crops larger than granular grains.

4. A yield monitoring system according to claim 1, wherein the parallel linkages are laterally spaced apart.

5. A yield monitoring system according to claim 1, wherein the sensing element engages the support assembly intermediate the parallel linkages.

6. A yield monitoring system according to claim 5, wherein the sensing element extends transverse to an engagement element mounted orthogonally to the strike plate.

7. A harvester measurement system measuring material flow in a material flow path of a harvester, comprising:
   a strike plate positioned to deflect material in the flow path;
   a support assembly comprising a four bar linkage, the strike plate defining a first link of the linkage, the linkage including a pair of parallel arms including a first arm and a second arm defining second and third links pivotally connected to a mounting surface defining a fourth link;
   a load cell including a measurement element engaging the support assembly;
   wherein the harvester comprises a corn harvester.

8. A harvester measurement system according to claim 7, wherein the strike plate has a surface area of at least 75% of a cross sectional area of the flow path.

9. A harvester measurement system according to claim 7, wherein the support assembly comprises a pair of the linkages, wherein the linkages are parallel linkages and laterally spaced apart.

10. A harvester measurement system according to claim 9, wherein the measurement element engages the support assembly intermediate the parallel linkages.

11. A harvester measurement system according to claim 10, wherein the strike plate includes a load cell engagement element mounted at an orthogonal angle to a surface of the strike plate, and wherein the measurement element extends transverse to the engagement element.

12. A harvester measurement system according to claim 7, further comprising isolator mounts.

13. A harvester measurement system measuring material flow in a material flow path, comprising:
    a strike plate positioned to deflect material in the flow path;
    a support assembly comprising a four bar linkage, the strike plate defining a first link of the linkage, the linkage including a pair of parallel arms including a first arm and a second arm defining second and third links pivotally connected to a mounting surface defining a fourth link, and torsion tubes aligned along pivot axes of the linkage;
    a load cell including a measurement element engaging the support assembly.

14. A harvester measurement system according to claim 13, wherein the strike plate is configured to deflect ear corn.

15. A harvester measurement system measuring material flow in a material flow path, comprising:
    a strike plate positioned to deflect material in the flow path;

a support assembly comprising a pair of parallel four bar linkages, the strike plate defining a first link of each of the linkages, each of the linkages including a pair of parallel arms including a first arm and a second arm defining second and third links pivotally connected to a mounting surface defining a fourth link; the strike plate including a mounting bracket with a first upper portion connecting to the first arm, and a second lower portion mounting to the second arm, the lower portion extending further from a face of the strike plate than the upper portion; and a load cell including a measurement element engaging the support assembly.

16. A harvester measurement system according to claim 15, wherein the first arm and the second arm are oriented vertically.

17. A harvester measurement system according to claim 15, wherein the first parallel arm is positioned above and spaced apart from the second parallel arm and intermediate the second arm and the strike plate.

18. A harvester measurement system according to claim 15, wherein the load cell is transverse to the parallel arms.

19. A harvester measurement system according to claim 18, wherein the support assembly is configured to exert force horizontally against the load cell.

20. A harvester measurement system according to claim 19, wherein the strike plate and support assembly exert no force on the load cell in a no flow condition.

21. A harvester measurement system according to claim 15, further comprising isolator mounts.

* * * * *